United States Patent [19]

Harrison

[11] Patent Number: 4,887,379
[45] Date of Patent: Dec. 19, 1989

[54] BASS BOAT PEDESTAL SEAT-MOUNTED TACKLE BOX

[76] Inventor: Dan W. Harrison, Rte. #1, Box 507, Brownsboro, Tex. 75756

[21] Appl. No.: 162,806

[22] Filed: Mar. 1, 1988

[51] Int. Cl.⁴ ............................................. A01K 97/00
[52] U.S. Cl. ..................................... 43/54.1; 297/192
[58] Field of Search .......................... 297/192; 43/54.1; 312/266.2; 206/315.11

[56] References Cited

U.S. PATENT DOCUMENTS

| | | | |
|---|---|---|---|
| 2,264,744 | 1/1941 | Dunnam | 297/192 |
| 2,692,007 | 10/1954 | Christian | 297/192 |
| 2,765,025 | 10/1956 | Bakalic et al. | 297/192 |
| 4,624,502 | 11/1986 | Boole | 297/192 |
| 4,682,813 | 7/1987 | Fohr et al. | 297/192 |
| 4,745,704 | 5/1988 | Schaefer | 213/54.1 |

Primary Examiner—Richard K. Seidel
Assistant Examiner—Karen Skillman
Attorney, Agent, or Firm—Hubbard, Thurman, Turner & Tucker

[57] ABSTRACT

A fishing tackle box is secured to the underside of a bass boat pedestal seat by mounting structure that permits the box to be pivoted relative to the seat between a latched stowage position in which the box is positioned entirely beneath and closely adjacent the underside of the seat, and a use position in which the box is positioned outwardly adjacent the side edge periphery of the seat for ready access by a fisherman sitting in the seat. The mounting structure includes a pivotal mounting member intersecured between the seat and box, and a latch member pivotable between a latching position in which its engages the box and holes it in its stowage position, and a release position permitting the pivotally mounted box to be swung outwardly to its use position.

6 Claims, 3 Drawing Sheets

BASS BOAT PEDESTAL SEAT-MOUNTED TACKLE BOX

BACKGROUND OF THE INVENTION

The present invention relates generally to equipment storage, and, in a preferred embodiment thereof, more particularly provides a fishing tackle box and associated mounting apparatus for supporting the tackle box beneath an elevated seat, such as a pedestal seat commonly used in bass boats, for pivotal movement between stowage and use positions.

A longstanding problem confronting the boat fisherman is where to put his tackle box in the boat so that it is easily and rapidly accessible, yet is not in the way when he moves about the boat. Heretofore, the choices of tackle box placement have been somewhat limited. The box could be placed on the floor of the boat, on a vacant seat therein, or on various ledge portions of the boat. In each of these locations, however, the tackle box was prone to being knocked over, kicked over, or simply jostled by a passing occupant of the boat. The typical result of the tackle box being in the way in this manner was that the lures and the like therein were dislodged from their individual compartments within the box or (if the tackle box lid was open) being spilled or thrown from the box in a tangle of intertwined hooks. As all boat fisherman know, either of these events is a frustrating experience which cuts into productive fishing time. Additionally, if the dislodged lures fall upon a boat seat or the boat floor, they can easily cause injury to the unwary fisherman.

In view of the foregoing, it is an object of the present invention to provide apparatus for securely holding and more conveniently positioning a tackle box in a manner overcoming these conventional problems and inconveniences.

SUMMARY OF THE INVENTION

In carrying out principles of the present invention, in accordance with a preferred embodiment thereof, a tackle box, or other equipment storage container, is conveniently secured to the underside of an elevated boat seat by means of specially designed mounting apparatus which permits the tackle box to be easily and rapidly moved between a stowage position in which the box is snugly disposed beneath and closely adjacent the underside of the seat inwardly of its side edge periphery, and a use position in which the box is disposed outwardly and downwardly of, but closely adjacent such side edge periphery. In its stowage position the box is held safely out of harm's way and cannot easily be kicked, bumped or jostled by the boat's occupants since it is shielded by the seat. However, in its use position, the box is quite easily reached by a fisherman sitting in the seat.

The mounting apparatus, in a preferred embodiment thereof, comprises means for connecting the tackle box to the underside of the seat for pivotal movement relative thereto between the stowage and use positions of the box, and latch means for engaging and releasably holding the tackle box in it stowed position beneath the seat, and precluding appreciable movement of the box relative to the seat, the latch means being easily and quickly operable by the seated fisherman.

While the tackle box could be provided with a variety of alternate configurations, the tackle box used in a preferred embodiment of the present invention is a relatively shallow, elongated rectangular box with a top mounted lid. The latch means in their operative position function to hold the lid shut. Additional security against undesired lid opening is provided by the placement of the lid directly beneath the underside of the seat when the box is in its stowage position. If desired, the upper surface of the lid may have formed thereon a circular ridge adapted to receive and support a lower end portion of a cup or beverage can when the tackle box is swung out to its use position.

DETAILED DESCRIPTION

Figure 1:
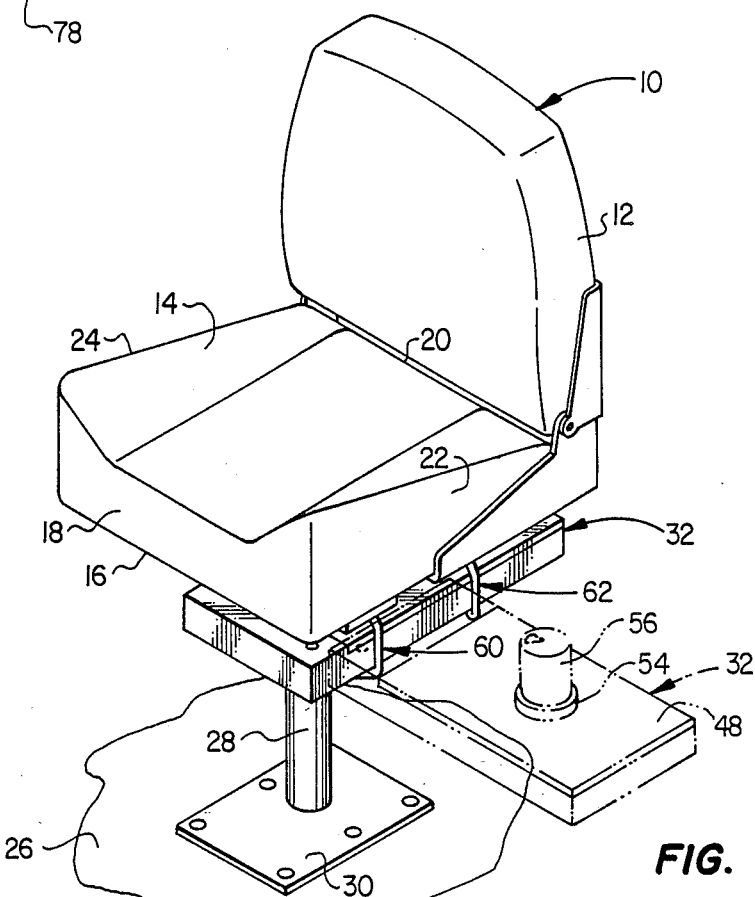
FIG. 1 is a perspective view of a pedestal type boat seat to the underside of which a tackle box is secured, using mounting apparatus of the present invention, for pivotal movement between a solid line stowage position in which the box is disposed entirely beneath the seat, and a dotted line, outwardly pivoted use position in which the box extends outwardly to one side from a front corner portion of the seat.

Illustrated in FIG. 1 is a pedestal mounted bass boat seat 10 having a foldable backrest portion 12 and a seat portion 14 having an underside 16 bordered by a peripheral side edge portion of the seat which includes front and rear side portions 18, 20 and, as viewed from the front of the seat, right and left side portions 22, 24. The seat portion 14 is supported in an elevated position relative to the floor 26 of the boat by a metal support column 28 pivotally secured at its upper end to the underside 16 of the seat (see FIG. 3) and at its bottom end to a deck pedestal plate 30 anchored to the boat floor 26. In a conventional manner not pertinent to the present invention, the height of the column-supported seat 14 above the boat floor 26 is selectively adjustable.

The present invention uniquely provides mounting apparatus for securing a fishing tackle box 32 to the underside 16 of the elevated seat 14 for movement relative thereto between a stowage position and a use position. In its stowage position (indicated by solid lines in FIG. 1) the tackle box 32 is positioned entirely beneath and closely adjacent the underside 16 of the seat 14 where the box is protected from being bumped, kicked or otherwise jostled by a passing fisherman. In its use position (illustrated in phantom in FIG. 1) the tackle box 32 extends outwardly from the peripheral right side portion 22 of the seat 14, adjacent the front side portion 18, so that the box 32 may be easily and quickly reached by a fisherman sitting in the seat 10.

Figure 2:
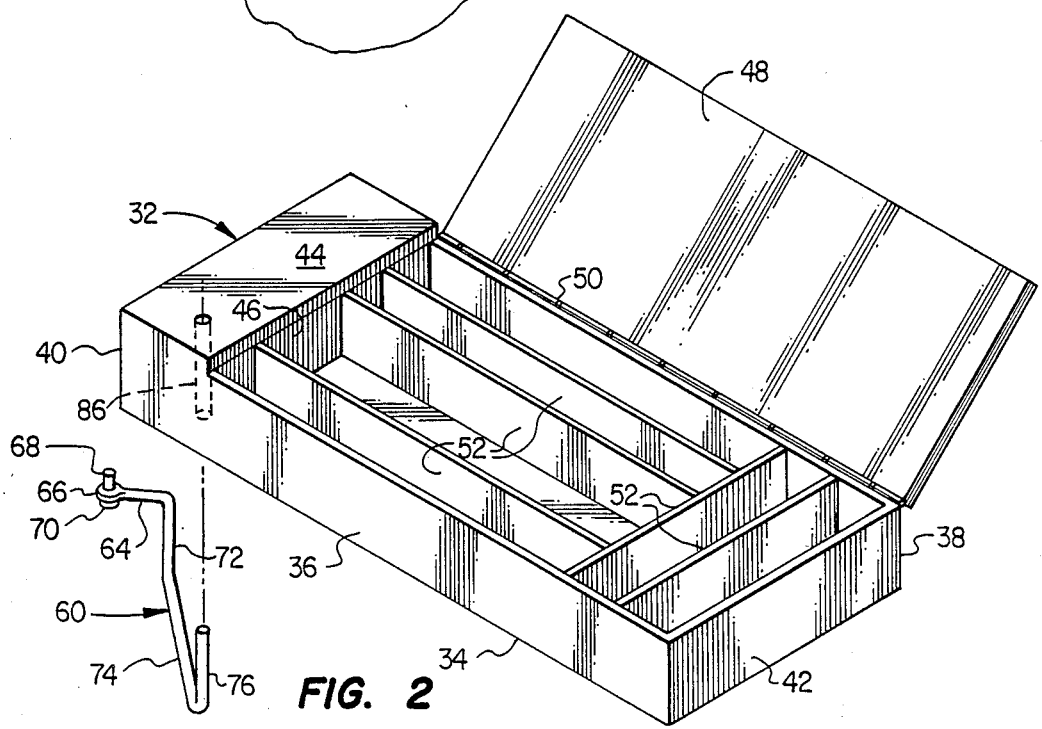
FIG. 2 is an enlarged scale partially exploded perspective view of the tackle box and a pivot arm portion of the mounting apparatus removably securable thereto.

Referring now to FIG. 2, the tackle box 32 is preferably of a molded plastic construction but could be formed from other suitable materials if desired. While the tackle box could be provided with a variety of alternative configurations, it is preferably of a relatively shallow, elongated rectangular configuration and has a bottom wall 34, a pair of elongated front and rear walls 36 and 38, and a pair of considerably shorter left and right end walls 40 and 42. For purposes later described, a left end portion 44 of the box has an elongated solid plastic reinforcing block 46 secured within its interior. The balance of the box, as illustrated, has a top opening which may be selectively covered and uncovered by a lid 48 which is hinged, as at 50, to the upper edge of the rear wall 38. In a conventional manner, the interior of the tackle box is partitioned by various panels 52 into separate lure and tackle receiving compartments. If desired, the outer side surface of the lid 48 (FIG. 1) may have formed thereon an upstanding circular ridge 54 in which a beverage can 56 or the like may be supported when the lid is in its closed position and the box 32 is in its outwardly projecting use position.

Figure 4:
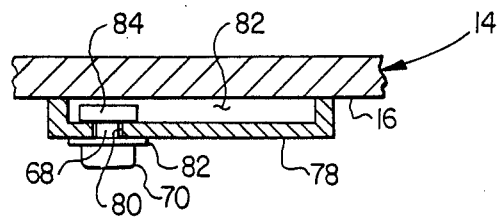
FIG. 4 is an enlarged scale fragmentary cross-sectional view, partially in elevation, through the seat and a portion of the mounting apparatus taken along line 4—4 of FIG. 3.
Figures 3, 5, 6:
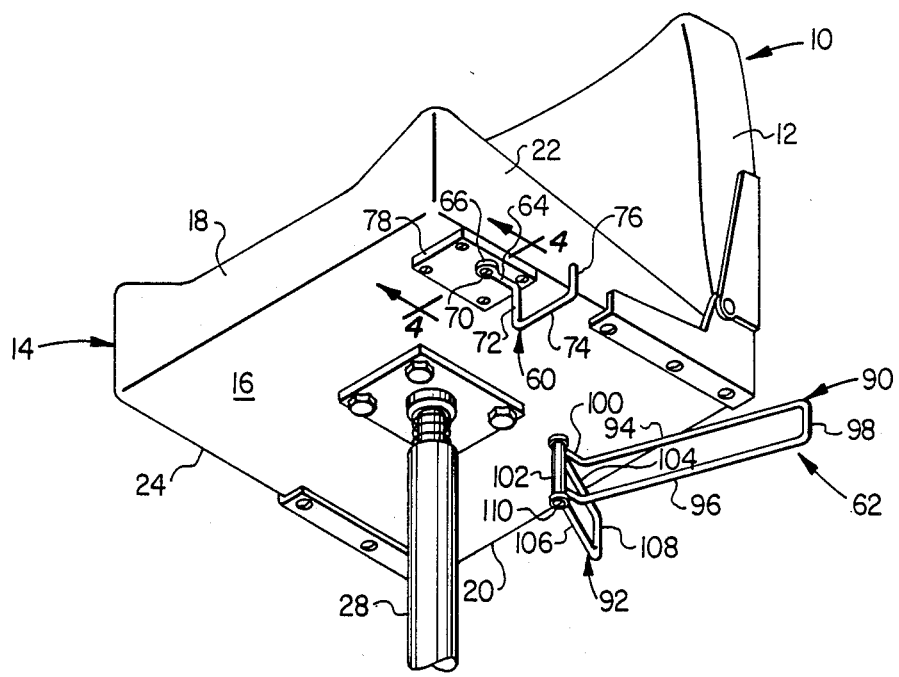
FIG. 3 is an enlarged scale bottom side perspective view of the seat illustrating the mounting apparatus with the tackle box removed therefrom.
FIGS. 5–8 are bottom views of the seat, with the mounted tackle box being depicted in phantom, and sequentially illustrate the operation of the mounting apparatus as the tackle box is moved from its stowage position to its outwardly pivoted use position.
Figure 8:
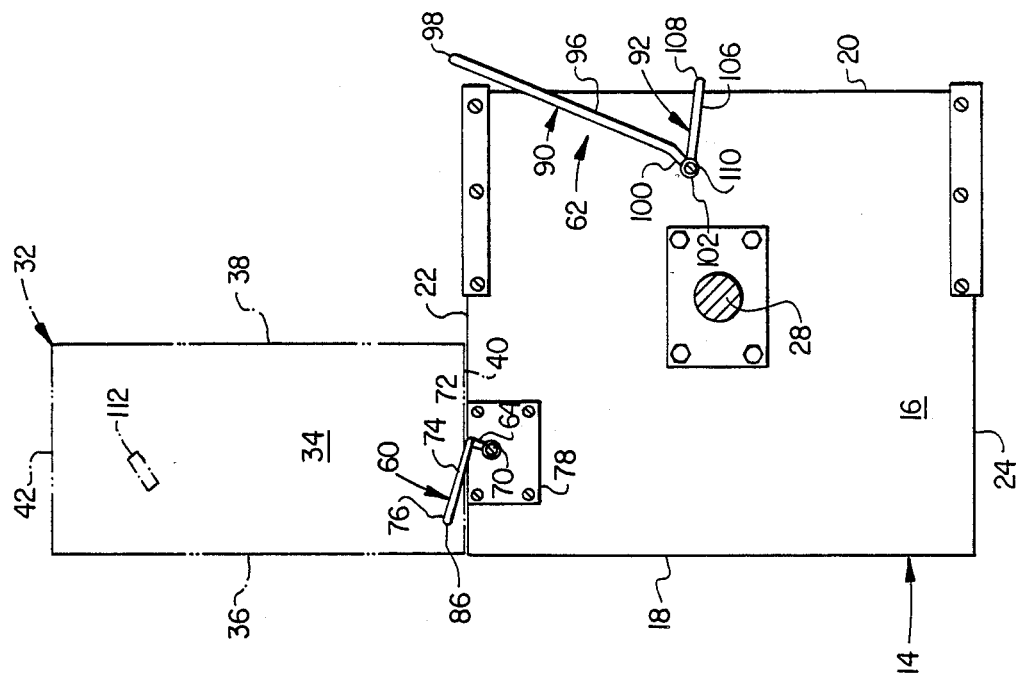

Turning now to FIG. 3, the tackle box mounting apparatus of the present invention is secured to the underside 16 of the seat portion 14 and includes a pivot arm member 60 and a latching structure 62 which are conveniently formed from appropriately bent lengths of metal rod material. The pivot arm 60, which is also shown in FIG. 2, has a horizontally oriented inner end section 64 with an enlarged, generally disc-shaped outer end 66 which is pivotally secured to a mounting pin 68 having an enlarged lower end 70. Starting at the opposite end of the inner end section 64, the rod which forms the pivot arm member 60 is appropriately bent to define a downwardly extending rod portion 72, a horizontally extending bottom rod portion 74, and an upturned outer end portion 76. The pivot arm member 60 is pivotally mounted on the underside 16 of the seat portion 14 by means of a mounting plate 78 (FIGS. 3 and 4) which is suitably anchored to the underside 16 of the seat portion 14 adjacent the juncture of the peripheral side portions 18, 22 thereof. The plate 78 has a small circular opening 80 formed therethrough and is provided with an upper side surface recess 82. The pin 68 is extended through a suitable washer 82 and then upwardly through the plate opening 80 into the plate recess 82. To captively retain the pin 68 on the plate 78, an upper end portion of the pin is enlarged as at 84 (FIG. 4). To pivotally mount the tackle box 32 to the seat portion 14, for movement relative thereto in a manner subsequently described, the upturned outer end portion 76 of the pivot arm member 60 is removably inserted upwardly into a circular bore 86 (FIG. 2) which extends upwardly through the bottom wall 34 of the box and the internal reinforcing block 46 adjacent the front side 36 of the tackle box.

The latching structure 62 includes an elongated, generally U-shaped latch member 90, and a considerably shorter, generally U-shaped latch member 92. The latch member 90 has a pair of horizontally disposed upper and lower arm portions 94 and 96 which are intersecured at their outer ends by a vertically extending outer end section 98. The inner ends of the arms 94, 96 are offset, as at 100, relative to the balance of the latch member 90 and are fixedly secured to the side of a cylindrical sleeve member 102.

The shorter latch member 92 has a pair of horizontally extending elongated upper and lower arms 104 and 106 which are intersecured at their outer ends by an outer end section 108. The inner ends of the arms 104, 106 are fixedly secured to the sleeve 102 to position the latch members 90, 92 at an angle relative to one another as best depicted in FIG. 5.

The sleeve 102, and thus the latch members 90 and 92, is pivotally secured to the underside 16 of the seat portion 14 by means of a pivot screw 110 which is extended upwardly through the interior of the sleeve 102 and suitably fastened at its upper end to the underside 16 of the seat portion 14. As indicated in FIG. 5, the pivot pin 110 is located generally centrally between the rear side edge 20 of the seat and the support column 28, and generally centrally between the side edges 22 and 24 of the seat.

The operation of the previously described mounting structure, and the use of the tackle box 32, will now be described with reference to FIGS. 5-8 in which the tackle box is depicted in phantom for illustrative purposes. The tackle box 32 is shown in FIG. 5 in its stowage position in which it is firmly held beneath the seat portion 14, inwardly of the side edge periphery thereof, by the pivot arm member 60 and the latching structure 62. In such stowage position, the end 40 of the tackle box is adjacent the front side edge 18 of the seat portion 14, the front wall 36 of the box is adjacent the left side edge 22 of the seat portion, and the end 42 of the box is adjacent the rear side edge 20 of the seat. The horizontal portion 74 of the pivot arm member 60 extends along the bottom wall 34 of the tackle box, the pivot arm member portion 72 extends upwardly along the front wall 36 of the tackle box, and the inner end section 64 of the pivot arm member extends inwardly across the lid of the tackle box.

As viewed in FIG. 5, a right end portion of the tackle box extends through the interior of the latch member 90 with the lower arm portion 96 of such latch member extending along the bottom wall 34 of the tackle box, and the outer end section 98 of the latch member 90 abutting the front wall 36 of the tackle box. When the latching structure 62 is pivoted in a counterclockwise direction to its latching position as subsequently described, the lower arm 96 of the latch member 90 is snapped over a rectangular surface projection 112 formed on the bottom tackle box wall 34. The projection 112 engages the lower arm portion 96 of the latch member 90 to prevent undesired clockwise rotation of the latching structure 62 toward a subsequently described unlatching position thereof. With the latch member 90 in this position, a lower right corner portion of the tackle box 32 (as viewed in FIG. 5) extends through the interior of the latch member 92, with the lower arm portion 106 thereof extending along the bottom wall 34 of the tackle box, the outer latch member end portion 108 engaging the end wall 42 of the tackle box, the upper arm portion 104 engaging and extending across the lid of the tackle box, and the sleeve member 102 engaging the rear wall 38 of the tackle box.

Before describing the manner in which the tackle box 32 is easily and quickly unlatched by a fisherman sitting in the seat 10, and then swung out to its use position, it should be noted that the pivot arm member 60 and the latching structure 62 cooperate to very firmly and efficiently brace the stowed tackle box 32 against side-to-side, end-to-end, or pivotal motion relative to the seat portion 14. Specifically, it can be seen that the vertically extending mounting structure portions 72, 76, 98 and 102 prevent appreciable side-to-side movement of the tackle box relative to the seat, vertical portions 76 and 108 prevent appreciable end-to-end movement of the box, and portions 72, 98, 108 and 110 preclude appreciable pivotal motion of the box relative to the seat. Moreover, the upper arm portion 94 of the latch member 90, together with the closely adjacent underside 16 of the seat portion 14, prevent the tackle box lid from opening when the box is in its stowage position.

To rapidly and quite easily unlatch the tackle box 32, a fisherman sitting on the seat portion 14 simply reaches down to his side, grasps the outer end section 98 of the latch member 90 and pushes it toward the rear side edge 20 of the seat portion 14. This motion imparted to the latch structure 62 unsnaps the arm portion 96 from the bottom wall projection 112 of the tackle box, and pivots the latch structure 62 in a clockwise direction to its position depicted in FIG. 6, thereby completely disengaging the latch members 90, 92 from the tackle box. The fisherman then grasps the end 42 of the tackle box and pivots the box in a counterclockwise direction (as viewed in FIG. 6) about the pin 70 through an arc of approximately 90° to bring the box to its position illustrated in FIG. 6 in which a major longitudinal portion of the box extends transversely outwardly from the side edge 22 of the seat portion 14. This counterclockwise pivoting of the tackle box also pivots the supporting arm member 60 from its position shown in FIG. 5 to its position shown in FIG. 6.

Figure 7:
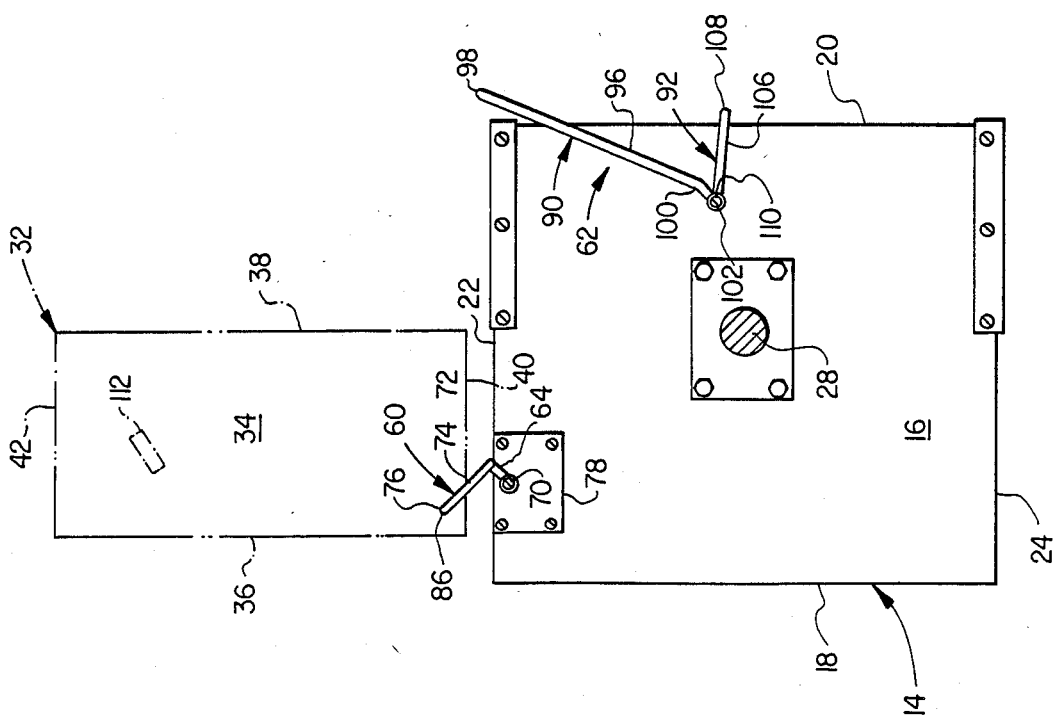

Next, the fisherman longitudinally pulls the tackle box outwardly from the side edge 22 of the seat portion 14 which moves the box to its position depicted in FIG. 7 in which it is positioned outwardly of and transverse to the seat side edge 22. This outward movement of the tackle box further pivots the arm member 60 in a counterclockwise direction to its position shown in FIG. 7 in which the front wall 36 of the tackle box is positioned rearwardly of the front side edge 18 of the seat portion 14.

Finally, the fisherman then pushes the tackle box forwardly (i.e., leftwardly as viewed in FIG. 7) and inwardly toward the side edge 22 of the seat portion 14. This final movement of the tackle box brings it to its fully extended use position, depicted in FIGS. 1 and 8, in which the front wall 36 of the box is generally aligned with the front side edge 18 of the seat portion 14, and the left end 40 of the box is closely adjacent the left side edge 22 of the seat. This very conveniently positions the tackle box for use by the seated fisherman and allows the lid of the tackle box to be easily and quickly opened and closed, or used, as previously described, as a drink-supporting platform.

To relatch the tackle box 36 in its stowage position beneath the seat portion 14, the previously described sequential movement of the box is simply reversed. Specifically, starting with the box in its use position depicted in FIG. 8, the box is pivoted outwardly and rearwardly relative to the seat (FIG. 7), is pushed inwardly beneath the seat to its position depicted in FIG. 6, and is then pivoted in a clockwise direction to bring it to its stowage position shown in FIG. 5. The latch structure 62 is then pivoted in a clockwise direction to snap the arm portion 96 past the retaining tackle box wall projection 112 and to bring the latch members 90 and 92 into operative latching engagement with the tackle box.

If it is desired instead to remove the tackle box 32 from the seat 10 (for example, at the end of a day's fishing) the box in its use position may be simply lifted off the upturned outer end portion 76 of the pivot arm member 60 in the manner shown in FIG. 2. When it is desired to use the tackle box again, the box is simply reinstalled on the pivot arm member 60, pivoted to its stowage position beneath the seat, and releasably latched in such position as previously described.

It can be seen from the foregoing that the present invention uniquely yet quite inexpensively provides a safer and considerably more convenient method of providing a fisherman with ready access to his fishing lures and other equipment conventionally carried in a tackle box. While the principles of the present invention are particularly well suited to this fishing tackle application, it will readily be appreciated that they could also be employed in conjunction with equipment storage containers of other types (such as, for example, tool boxes) and could also be employed on various other types of elevated seats. Additionally, both the tackle box support means and latching means illustrated and described herein could be provided with a variety of alternative configurations if desired.

The foregoing detailed description is to be clearly understood as being given by way of illustration and example only, the spirit and scope of the present invention being limited solely by the appended claims.

What is claimed is:

1. Equipment stowage apparatus for use in conjunction with an elevated seat having an underside and a peripheral side surface, comprising mounting structure for supporting an equipment storage container on the underside of the seat, the equipment storage container having spaced apart first and second portions, the second portion having oppositely facing upper and lower side surface sections and a vertical side surface section extending between the upper and lower side surface sections, said mounting structure including:

supporting means, interconnectable between the underside of the seat and the first portion of the container, for supporting the container for movement relative to the seat between a stowage position in which the container is disposed adjacent and essentially entirely beneath the underside of the seat, and a use position in which the container projects outwardly of the peripheral side surface of the seat in a manner permitting ready access thereto by a person sitting in the seat; and latch means, securable to the seat and selectively operable by a person sitting therein, for releasably engaging and supporting the second portion of the container and cooperating with said support means to hold the container in said stowage position thereof and restrain it against appreciable movement relative to the seat, said support means having a first end portion pivotally connectable to the underside of the seat, and a second end portion pivotally connectable to the first portion of the container, and said latch means being mountable to the underside of the seat in a spaced apart relationship with said support means for pivotal movement relative to the search between a latching position and an unlatching position, said latch means having a latching portion which, with said latch means in said latching position and the container in its stowage position extends along, engages and restrains the upper and lower side surface sections, and the vertical side surface section, of the second portion of the container.

2. Fishing tackle stowage apparatus for use in conjunction with an elevated boat seat having an underside and a peripheral side portion, comprising:

a tackle box;

support means for removably connecting said tackle box to the underside of the seat for movement relative thereto between a stowage position in which said tackle box is disposed adjacent and essentially entirely beneath the underside of the seat, and a use position in which said tackle box projects outwardly beyond the peripheral portion of the seat and is readily accessible by a fisherman sitting therein, said support means having first and second end portions, being pivotally connectable to the underside of the seat, and permitting said tackle box to be pivoted between its stowage and use positions in a substantially horizontal plane;

means for pivotally securing said first end portion of said support means to the underside of the seat;

means for pivotally securing said second end portion of said support means to said tackle box; and latch means, connectable to the underside of the seat in a spaced apart relationship with said support means, for releasably holding said tackle box in its stowage position beneath the seat, said latch means being operable by a fisherman sitting in the seat, and being pivotally movable relative to the seat between a latching position in which said means engage and partially support said tackle box and cooperate with said support means to hold said tackle box in its stowage position, and an unlatching position in which said latch means are disengaged from said tackle box and permit it to be moved outwardly to its use position, said latch means, in said latching position thereof, circumscribing a portion of said tackle box in said stowage position thereof and engaging and supporting an underside surface portion thereof.

3. Fishing tackle stowage apparatus for use in conjunction with an elevated boat seat having an underside and a peripheral side portion, comprising:

a tackle box sized to fit beneath the seat inwardly of its peripheral side portion;

a support member having first and second end portions;

means for pivotally securing said first end portion of said support member to the underside of the seat;

means for pivotally securing said second end portion of said support member to said tackle box in a manner permitting said tackle box to be pivoted relative to the seat in a generally horizontal plane between a stowage position in which said tackle box is disposed beneath and adjacent the underside of the seat and inwardly of the peripheral side portion of the seat, and a use position in which said tackle box is swung outwardly from beneath the seat and projects outwardly beyond the peripheral side portion thereof;

a latching structure having first and second generally U-shaped portions secured to a connecting member at an angle relative to one another; and means for securing said connecting member to the underside of the seat to permit said latching structure to be pivoted relative thereto between an unlatching position permitting said tackle box to be pivoted between its stowage and use positions, and a latching position in which said generally U-shaped portions of said latching structure extend around first and second portions of said tackle box and cooperate with said support member to releasably hold said tackle box in its stowage position and stabilize said tackle box against appreciable movement relative to the seat.

4. The fishing tackle stowage apparatus of claim 3 wherein:

said tackle box has an external surface projection formed thereon, and one of said generally U-shaped portions of said latching structure has a section adapted to be snapped over said projection, as said latching structure is operatively moved to its latching position, to releasably hold said latching structure in its latching position on said tackle box.

5. The fishing tackle stowage apparatus of claim 3 wherein:

said tackle box has an elongated rectangular shape, said second end portion of said support member is pivotally secured to a first end portion of said tackle box, and said generally U-shaped portions of said latching structure are adapted to extend around first and second portions of a second end portion of said tackle box.

6. The fishing tackle stowage apparatus of claim 3 wherein:

said tackle box has a top lid portion having a circular ridge formed thereon which is adapted to receive and support a lower end portion of a drink container when said tackle box is in its use position.

* * * * *